F. & H. GRIEB.

Formation and Mode of Securing the Spikes of Thrashing Machines.

No. 985. Patented Oct. 19, 1838.

UNITED STATES PATENT OFFICE.

FRED. GRIEB AND HENRY GRIEB, OF HAGERSTOWN, MARYLAND.

THRESHING-MACHINE.

Specification of Letters Patent No. 985, dated October 19, 1838.

*To all whom it may concern:*

Be it known that we, FREDERICK GRIEB and HENRY GRIEB, of Hagerstown, in the county of Washington and State of Maryland, have invented a new and useful Improvement in the Formation and Mode of Adjusting the Spikes of Threshing-Machines; and we do hereby declare that the following is a full and exact description thereof, reference being had to the drawings, accompanying and making part of said description.

This improvement consists in making spikes of sufficient length and strength to be flattened on that end above the cylinder and concave and being attached by having the other end formed of a screw are thus made adjustable.

Figure 3:
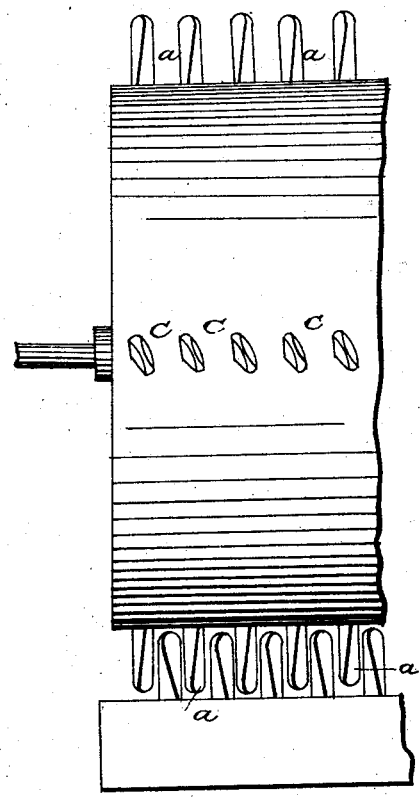
Figure 2:
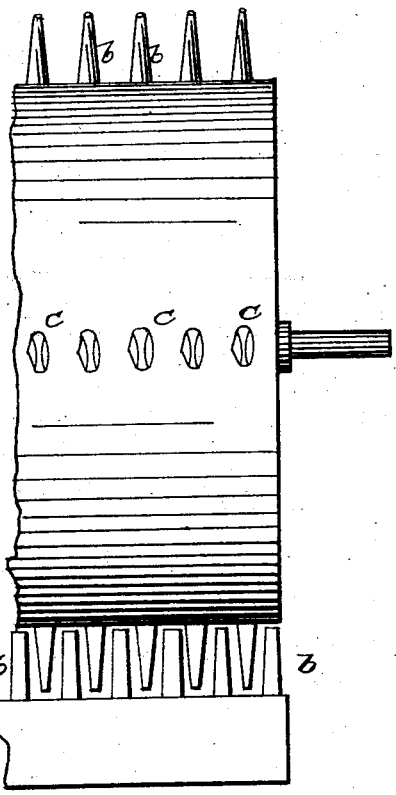
Figure 1:
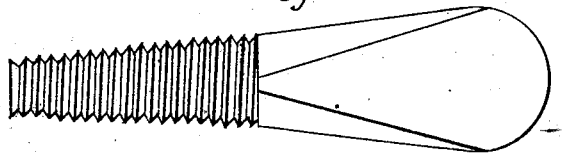

Figure 1 shows the form of the spike with the screw at one end and flattened at the other. Fig. 2 is a section of the concave and cylinder of a threshing machine and shows that position of the spikes, when required to thresh large grain. Fig. 3, shows them turned or in that position when necessary to thresh small grain.

As seen at $a$, Fig. 3, the spikes after being screwed into their proper places are turned partly around, thus more nearly filling the space between the spikes of the concave, and if necessary they may be turned entirely around so that their flattened surfaces will be on a direct line with the spikes of the concave.

$b$, Fig. 2, represents them in that position in which the flattened surface is in a direct line with that produced by the revolution of the cylinder.

$c$, Figs. 2 and 3, shows the ends of a number of spikes made in this manner.

It may be understood that the spikes of the concave can, if desired, be made adjustable in the same manner.

Now we do not claim to be the first to have made the spikes of threshing machines adjustable, nor the mode of securing them by screwing, but We do claim as our invention and desire to secure by Letters Patent—

Our particular mode of adjusting the spaces between the spikes in the concave and on the cylinder in the manner and for the purposes herein described, the adjustment being effected by the peculiar form of the spikes conjointly with the turning of them.

FREDERICK GRIEB.
HENRY GRIEB.

Witnesses:
JOHN W. HUBBARD,
JAMES STEWART.